United States Patent
Iwazumi et al.

(10) Patent No.: US 8,022,163 B2
(45) Date of Patent: Sep. 20, 2011

(54) INTERNAL MOLD RELEASE AGENT FOR PRODUCTION OF POLYTHIOURETHANE OPTICAL MATERIAL

(75) Inventors: Masanori Iwazumi, Omuta (JP); Nobuo Kawato, Kurume (JP); Hidetoshi Hayashi, Omuta (JP); Mamoru Tanaka, Omuta (JP); Seiichi Kobayashi, Omuta (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 265 days.

(21) Appl. No.: 12/280,312

(22) PCT Filed: Feb. 19, 2007

(86) PCT No.: PCT/JP2007/000097
§ 371 (c)(1),
(2), (4) Date: Aug. 21, 2008

(87) PCT Pub. No.: WO2007/105355
PCT Pub. Date: Sep. 20, 2007

(65) Prior Publication Data
US 2010/0234498 A1    Sep. 16, 2010

(30) Foreign Application Priority Data

Feb. 23, 2006 (JP) ................ 2006-046213

(51) Int. Cl.
*C08G 18/22* (2006.01)
*C08K 5/521* (2006.01)

(52) U.S. Cl. ............ 528/51; 528/85; 523/105; 524/136; 524/140

(58) Field of Classification Search .............. 524/140, 524/136; 523/105; 528/85, 51
See application file for complete search history.

(56) References Cited

U.S. PATENT DOCUMENTS

| 5,753,730 A * | 5/1998 | Nagata et al. ............... 524/136 |
| 5,962,561 A * | 10/1999 | Turshani et al. ............. 524/140 |
| 6,441,119 B1 * | 8/2002 | Kosaka ....................... 528/49 |
| 6,706,894 B2 * | 3/2004 | Okubo et al. ................ 549/19 |

FOREIGN PATENT DOCUMENTS

| JP | 58-63747 A | 4/1983 |
| JP | 3-273030 A | 12/1991 |
| JP | 6-20752 B2 | 3/1994 |
| JP | 6-91682 A | 4/1994 |
| JP | 7-118989 B2 | 12/1995 |
| JP | 10-81726 A | 3/1998 |
| JP | 2842658 B2 | 1/1999 |
| JP | 11-43493 A | 2/1999 |
| JP | 2000-281687 A | 10/2000 |
| JP | 2001-72692 A | 3/2001 |
| JP | 2001-342235 A | 12/2001 |

OTHER PUBLICATIONS

International Search Report (PCT/ISA/210), Mar. 2007.

* cited by examiner

*Primary Examiner* — Tae H Yoon
(74) *Attorney, Agent, or Firm* — Buchanan Ingersoll & Rooney PC

(57) ABSTRACT

Disclosed is an internal mold release agent for the production of polythiourethane optical materials, which is obtained by mixing an acidic phosphate ester compound and at least one metal selected from the group consisting of Zn, Cu, Fe, Ga, Bi, Al and Zr. The internal mold release agent for the production of polythiourethane optical materials contains the metal in an amount of 0.01 to 20 weight %.

5 Claims, No Drawings

INTERNAL MOLD RELEASE AGENT FOR PRODUCTION OF POLYTHIOURETHANE OPTICAL MATERIAL

TECHNICAL FIELD

The present invention relates to an internal mold release agent for the production of polythiourethane optical materials, a process for producing the internal mold release agent, a composition for a polythiourethane optical material using the internal mold release agent and a process for producing the composition. The polythiourethane optical material obtained by using the internal mold release agent of the present invention is suitably used as a plastic lens, particularly a plastic lens material for spectacles.

BACKGROUND ART

Transparent resins have been used for various kinds of optical materials using transparency equivalent to that of a mineral glass and impact property higher than that of a mineral glass. When one of transparent resins, a polythiourethane resin, is molded by casting polymerization and thus produced, a product cannot be obtained unless a resin is released from a mold. As known from the fact that a urethane resin is also used as an adhesive, the polythiourethane resin has been known as a resin having very strong adhesion so that it is essential to use a mold release agent for releasing the resin from the mold.

Examples of the mold release agent include an external mold release agent for coating a mold surface using a spray or the like and an internal mold release agent to be added to a raw material monomer in advance. There are problems in the external mold release agent such that its operation is not only troublesome, but also it is difficult to form a homogeneous release film and the surface precision is lowered. So, the internal mold release agent is preferably used.

Examples of the compound known as an internal mold release agent in the past include aliphatic alcohols, fatty acid esters, triglycerides, fluorine type surface active agents, higher fatty acid metal salts and the like. However, when these compounds were used, there have been defects such that it was difficult to be released, the surface or inside of the resin easily became turbid, and transparency of a resin by nature was easily deteriorated. In the field of optical materials including typical examples of plastic lenses requiring very high transparency, such deteriorated transparency becomes a very critical defect. Herein, as a means to solve the problem, various proposals have been made. For example, an internal mold release agent of an acidic phosphate ester compound and the like as described in Patent Documents 1 to 6 can be cited. In Patent Documents 1 to 3, there has been described that, as an additive other than an internal mold release agent, an organic tin compound such as dibutyltin dichloride and the like is necessarily added as a polymerization catalyst or a polymerization initiator.

By the way, as a catalyst used in the production reaction of a polythiourethane resin, organic tin type catalysts including typical examples of DBC (dibutyltin dichloride) and DBTDL (dibutyltin dilaurate) have been widely used from the past in view of the fact that the catalytic activity is high. However, problems have, in late years, been pointed out in these organic tin type catalysts from the viewpoints of toxicity and safety.

For example, tributyltin contained in DBTDL as impurities has a problem of the risk of injury to the human body as an environmental hormone. Furthermore, there has already been a movement to control the use of organic tin compounds in Europe taking the lead in this movement. Therefore, in the business world of spectacle lenses using polythiourethane resins, it has been urgently desired to develop a tin substituted catalyst. From now on, not only in Europe but also throughout the world, it is highly possible that the regulation on the use of organic tin catalysts is still more strengthened, while, in the polyurethane market, it becomes essential to develop a catalyst with high safety and high activity which can be a substitute of an organic tin catalyst.

To produce a polythiourethane resin as a material for plastic lenses, a casting polymerization method in which a polymerizable composition is generally injected into a mold for heat curing can be taken, whereas the polymerization reaction is carried out while gradually raising the temperature from low temperature to high temperature over several hours to several tens of hours. At that time, in order to obtain an optically homogeneous plastic lens, adding a catalyst is required to slowly carry out the polythiourethanization reaction controlled by heat lest thermal inhomogeneity be occurred while raising the temperature. Furthermore, in order to achieve full resin properties including optical properties, heat resistance and strength, it is necessary to complete the polymerization. In order to complete the polymerization, a method in which a catalyst with strong polymerization activity is used or an amount of the catalyst is increased can be cited. However, such a method has a problem such that the polymerization reaction has all been progressed while the prepared polymerizable composition is injected into a mold, that is, a sufficient pot life cannot be secured. Further, there is also a problem such that during the polymerization, exothermic heat is locally generated so that optical inhomogeneity is easily exhibited to lenses.

Patent Document 1: Japanese Patent Publication No. 1995-118989

Patent Document 2: Japanese Patent Publication No. 1994-20752

Patent Document 3: Japanese Patent No. 2842658

Patent Document 4: Japanese Patent Laid-open No. 1999-43493

Patent Document 5: Japanese Patent Laid-open No. 2000-281687

Patent Document 6: Japanese Patent Laid-open No. 2001-72692

DISCLOSURE OF THE INVENTION

An object of the present invention is to provide a substance having both functions of a polymerization catalyst and an internal mold release agent, that is, an internal mold release agent having a polymerization catalytic activity in order to simplify the operation of adding two additives of a polymerization catalyst and an internal mold release agent in the production of polyurethane optical materials. Furthermore, the catalytic activity of such an internal mold release agent is a catalytic activity equal to or higher than that of a conventional organic tin type compound which might be harmful, and the present invention is to provide an internal mold release agent which is tin free and has a polymerization catalytic activity equal to or higher than that of a conventional compound.

In order to solve the foregoing objects, the present inventors have conducted an extensive study and as a result, have found an internal mold release agent having a polymerization catalytic activity and releasability required for the production of a composition obtained by mixing an acidic phosphate ester compound and at least one metal selected from Zn, Cu, Fe, Ga, Bi, Al and Zr. Thus, the present invention has been completed.

That is, the present invention is specified by matters described in below:

[1] an internal mold release agent for the production of polythiourethane optical materials obtained by mixing an acidic phosphate ester compound and at least one metal selected from the group consisting of Zn, Cu, Fe, Ga, Bi, Al and Zr, wherein the metal is mixed in an amount of 0.01 to 20 weight % in the internal mold release agent;

[2] the internal mold release agent for the production of polythiourethane optical materials as set forth in [1], wherein the acidic phosphate ester compound is represented by the following general formula (1),

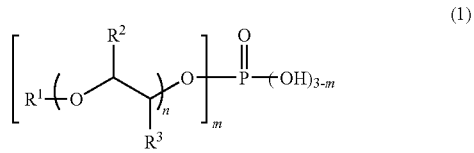

wherein, in the formula, m represents 1 or 2; n represents an integer of 0 to 20; $R^1$ represents an alkyl group having 1 to 20 carbon atoms, an alkylphenyl group having 7 to 20 carbon atoms or a phenylalkyl group having 7 to 20 carbon atoms; and $R^2$ and $R^3$ each independently represent a hydrogen atom, a methyl group or an ethyl group;

[3] the internal mold release agent for the production of polythiourethane optical materials as set forth in [2], wherein the metal is Zn;

[4] a process for producing the internal mold release agent for the production of polythiourethane optical materials as set forth in any one of [1] to [3], including mixing and reacting the acidic phosphate ester compound with metal powder containing at least one metal selected from the group consisting of Zn, Cu, Fe, Ga, Bi, Al and Zr;

[5] a composition for polythiourethane optical materials containing one or two or more isocyanates selected from the group consisting of isocyanate compounds and isothiocyanate compounds, one or two or more active hydrogen compounds each having a mercapto group, and the internal mold release agent for the production of polythiourethane optical materials as set forth in any one of [1] to [3];

[6] the composition for polythiourethane optical materials as set forth in [5], wherein the isocyanate is an isocyanate compound;

[7] the composition for polythiourethane optical materials as set forth in [6], wherein the isocyanate compound is one or two or more kinds selected from the group consisting of m-xylylene diisocyanate, 2,5-bis(isocyanatomethyl)-bicyclo [2.2.1]heptane, 2,6-bis(isocyanatomethyl)-bicyclo [2.2.1] heptane, 1,3-bis(isocyanatomethyl)cyclohexane, 1,4-bis(isocyanatomethyl)cyclohexane and hexamethylene diisocyanate; and the active hydrogen compound is one or two or more kinds selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1, 11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptomethylthio)ethyl)-1,3-dithietane;

[8] a polythiourethane optical material obtained by curing the composition for polythiourethane optical materials as set forth in any one of [5] to [7];

[9] a plastic lens composed of the polythiourethane optical material as set forth in [8];

[10] a process for producing polythiourethane optical materials by reacting one or two or more isocyanates selected from the group consisting of isocyanate compounds and isothiocyanate compounds with one or two or more active hydrogen compounds each having a mercapto group, in which the internal mold release agent for the production of polythiourethane optical materials as set forth in any one of [1] to [3] is used; and

[11] the process for producing polythiourethane optical materials as set forth in [10], in which the amount of the internal mold release agent for the production of polythiourethane optical materials added is not less than 100 ppm but not more than 10,000 ppm based on the total amount of isocyanates and the active hydrogen compounds.

At the time of producing polythiourethane optical materials, by using the internal mold release agent for the production of polythiourethane optical materials having a catalytic activity of the present invention, it is possible to provide a novel polymerization system of polythiourethane resins, and the operation to newly add a polymerization catalyst can be omitted. Furthermore, even though the internal mold release agent does not contain organic tin which is likely to be used under strengthened control, it has a catalytic activity equal to or higher than that of the conventional compound. Furthermore, the polythiourethane resin obtained by using the internal mold release agent of the present invention is particularly excellent in weather resistance as compared to that of the polythiourethane resin obtained by using a conventional organic tin catalyst.

Polythiourethane optical materials obtained by the internal mold release agent of the present invention are used for optical materials of plastic lenses, prisms, optical fibers, information recording substrates, filters, light emitting diodes or the like, and particularly suitably used as plastic lens materials for spectacles.

The aforementioned objects and other objects, characteristics and advantages become further clear by the appropriate embodiments to be described below and the following drawings accompanied thereto.

BEST MODE FOR CARRYING OUT THE INVENTION

The present invention will be illustrated in detail below.

The present invention relates to an internal mold release agent for the production of polythiourethane optical materials obtained by mixing an acidic phosphate ester compound and at least one metal selected from the group consisting of Zn, Cu, Fe, Ga, Bi, Al and Zr, wherein said metal is mixed in an amount of 0.01 to 20 weight % in the internal mold release agent.

Furthermore, the invention relates to the aforementioned internal mold release agent for the production of polythiourethane optical materials, wherein the acidic phosphate ester compound is represented by the following general formula (1):

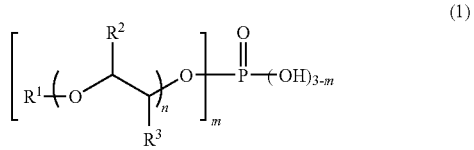

(1)

wherein, in the formula, m represents 1 or 2; n represents an integer of 0 to 20; $R^1$ represents an alkyl group having 1 to 20 carbon atoms, an alkylphenyl group having 7 to 20 carbon atoms or a phenylalkyl group having 7 to 20 carbon atoms; and $R^2$ and $R^3$ each independently represent a hydrogen atom, a methyl group or an ethyl group.

In the present invention, at least one metal selected from Zn, Cu, Fe, Ga, Bi, Al and Zr is mixed in the acidic phosphate ester compound. Among these metals, Zn, Al and Zr are more preferable, and Zn is further preferable.

These metals are mixed in an amount of 0.01 to 20 weight % based on the total weight of the internal mold release agent. When the amount of metals to be mixed is excessively high, a sufficient pot life cannot be secured from the viewpoint of polymerization rate or the obtained resin is possibly subjected to optical distortion. When the amount is excessively small, sufficient catalytic activity is not possibly obtained. The amount of metals to be mixed is more preferably from 0.01% to 10 weight % based on the total weight of the internal mold release agent. In such a range, a further sufficient pot life can be secured and resins that are also optically homogeneous can be obtained. To be described later, the internal mold release agent of the present invention is added preferably in the range of 100 to 10,000 ppm based on the total amount of isocyanates and the active hydrogen compounds. Further, in order to achieve sufficient catalytic activity while securing sufficient amount of metals, and in order to secure a more sufficient pot life, the amount of metals is further preferably from 0.1% to 5 weight % based on the total weight of the internal mold release agent. However, the amount of metals to be mixed can be suitably determined depending on the combination of monomers in use, the type of metals, the type of additives, amount and shape of molded products, and the molecular weight of an acidic phosphate ester compound.

In the present invention, the acidic phosphate ester compound is not particularly limited as far as it is a phosphate ester compound showing acidity. However, the acidic phosphate ester compound represented by the general formula (1) can be cited as a preferred embodiment.

In the acidic phosphate ester compound represented by the general formula (1) used in the present invention, m represents 1 or 2.

n represents an integer of 0 to 20 and more preferably an integer of 0 to 10.

$R^1$ represents an alkyl group having 1 to 20 carbon atoms, an alkylphenyl group having 7 to 20 carbon atoms or a phenylalkyl group having 7 to 20 carbon atoms. When the number of carbon atoms exceeds 20, transparency is lowered; therefore, it is possibly not desirable.

When $R^1$ is an alkyl group having 1 to 20 carbon atoms, examples of $R^1$ include a methyl group, an ethyl group, an n-propyl group, an isopropyl group, an n-butyl group, a sec-butyl group, an isobutyl group, a tert-butyl group, an n-pentyl group, an n-hexyl group, an n-heptyl group, a sec-heptyl group, a 1-propylbutyl group, an n-octyl group, a 2-ethylhexyl group, a sec-octyl group, an n-nonyl group, a 1-butylpentyl group, an n-decyl group, an n-undecyl group, a 1-pentylhexyl group, an n-dodecyl group, an n-tridecyl group, a 1-hexylheptyl group, an n-tetradecyl group, an n-pentadecyl group, a 1-heptyloctyl group, an n-hexadecyl group, an n-heptadecyl group, a 1-octylnonyl group, an n-octadecyl group, an n-nonadecyl group and a 1-nonyldecyl group. When $R^1$ is an alkylphenyl group having 7 to 20 carbon atoms, examples of $R^1$ include a methylphenyl group, a dimethylphenyl group, a propylphenyl group, a butylphenyl group, a pentylphenyl group, a hexylphenyl group, a heptylphenyl group, an octylphenyl group and a nonylphenyl group. When $R^1$ is a phenylalkyl group having 7 to 20 carbon atoms, examples of $R^1$ include a phenylmethyl group, a phenylethyl group, a phenylpropyl group, a phenylbutyl group and the like.

$R^1$ is preferably an alkyl group having 1 to 20 carbon atoms and more preferably an alkyl group having 3 to 16 carbon atoms.

$R^2$ and $R^3$ each independently represent a hydrogen atom, a methyl group or an ethyl group. Preferably, both $R^2$ and $R^3$ are hydrogen atoms, or any of $R^2$ or $R^3$ is a hydrogen atom and the other one is a methyl group.

As concrete examples of the acidic phosphate ester compound represented by the general formula (1), when n is 0, typical examples of the compound include (mono, di)methylphosphoric acid, (mono, di)ethylphosphoric acid, (mono, di)(n-propyl)phosphoric acid, (mono, di)isopropylphosphoric acid, (mono, di)(n-butyl)phosphoric acid, (mono, di)(n-pentyl)phosphoric acid, (mono, di)(n-hexyl)phosphoric acid, (mono, di)(n-heptyl)phosphoric acid, (mono, di)(n-octyl)phosphoric acid, (mono, di)(2-ethylhexyl)phosphoric acid, (mono, di)(n-nonyl)phosphoric acid, (mono, di)(n-decyl)phosphoric acid, (mono, di)isodecylphosphoric acid, (mono, di)(n-undecyl)phosphoric acid, (mono, di)(n-dodecyl)phosphoric acid, (mono, di)(n-tridecyl)phosphoric acid, (mono, di)(n-tetradecyl)phosphoric acid, (mono, di)(n-pentadecyl) phosphoric acid, (mono, di)(n-hexadecyl)phosphoric acid, (mono, di)(n-octadecyl)phosphoric acid, (mono, di)(o-methylphenyl)phosphoric acid, (mono, di)(p-methylphenyl)phosphoric acid, (mono, di)(p-ethylphenyl)phosphoric acid, (mono, di)(p-butylphenyl)phosphoric acid, (p-nonylphenyl) phosphoric acid, (mono, di)(phenylmethyl)phosphoric acid, (mono, di)(2-phenylethyl)phosphoric acid and (mono, di)(4-phenylbutyl)phosphoric acid. When n is 1, typical examples of the compound include (mono, di)(3-oxabutyl)phosphoric acid, (mono, di)(3-oxapentyl)phosphoric acid, (mono, di)(3-oxahexyl)phosphoric acid, (mono, di)(3-oxaheptyl)phosphoric acid, (mono, di)(3-oxaoctyl) phosphoric acid, (mono, di) (3-oxanonyl) phosphoric acid, (mono, di)(3-oxaundecyl) phosphoric acid, (mono, di)(3-oxamidecyl)phosphoric acid, (mono, di)(3-oxapentadecyl)phosphoric acid, (mono, di)(3-oxaheptadecyl)phosphoric acid, (mono, di)(3-oxanonadecyl) phosphoric acid, (mono, di)(3-oxaheneicosyl)phosphoric acid, (mono, di)(1-methyl-3-oxabutyl)phosphoric acid, (mono, di)(1-methyl-3-oxapentyl)phosphoric acid, (mono, di)(1-methyl-3-oxaheptyl)phosphoric acid, (mono, di)(1,2-dimethyl-3-oxaheptyl)phosphoric acid, (mono, di)(1-methyl-3-oxamidecyl)phosphoric acid, (mono, di)[1-methyl-2-(o-methylphenoxy)ethyl]phosphoric acid, (mono, di)[1-methyl-2-(p-nonylphenoxy)ethyl]phosphoric acid, (mono, di)[1-methyl-4-phenyl-3-oxabutyl]phosphoric acid and the like. When n is 2, typical examples of the compound include (mono, di)(3,6-dioxaheptyl)phosphoric acid, (mono, di)(3,6-dioxaoctyl)phosphoric acid, (mono, di)(3,6-dioxadecyl) phosphoric acid, (mono, di)(3,6-dioxatetradecyl)phosphoric acid, (mono, di)(3,6-dioxahexadecyl)phosphoric acid, (mono, di)(3,6-dioxaoctadecyl)phosphoric acid, (3,6-dioxaeicosyl)phosphoric acid, (3,6-dioxadocosyl)phosphoric acid, (mono, di)(3,6-dioxatetracosyl)phosphoric acid and (mono, di)(1,4-dimethyl-3,6-dioxadecyl)phosphoric acid. When n is not less than 3, typical examples of the compound include (mono, di)(3,6,9-trioxadecyl)phosphoric acid, (mono, di)(3,6,9-trioxaundecyl)phosphoric acid, (mono, di)(3,6,9-trioxamidecyl)phosphoric acid, (mono, di)(3,6,9-trioxaheptadecyl) phosphoric acid, (mono, di)(3,6,9-trioxaheneicosyl) phosphoric acid, (mono, di)(3,6,9-trioxaheptacosyl) phosphoric acid, (mono, di)(1,4,7-trimethyl-3,6,9-trioxamidecyl)phosphoric acid, (mono, di)(3,6,9,12-tetraoxahexadecyl)phosphoric acid, (mono, di)(3,6,9,12-tetraoxaoctadecyl)phosphoric acid, (mono, di)(3,6,9,12-tetraoxaeicosyl)phosphoric acid, (mono, di)(3,6,9,12-tetraoxadocosyl)phosphoric acid, (mono, di)(3,6,9,12-tetraoxatetracosyl)phosphoric acid, (mono, di)(1,4,7,10-tetramethyl-3,6,9,12-tetraoxahexadecyl)phosphoric acid and the like. However, the acidic phosphate ester compound represented by the general formula (1) is not restricted thereto. Further, acidic phosphate ester is usually a mixture of the compounds cited in the concrete examples and it is not necessarily composed of a single composition either.

Concrete examples of preferable acidic phosphate ester compound include compounds in which $R^1$ is an alkyl group having 3 to 16 carbon atoms, and both $R^2$ and $R^3$ are hydrogen atoms, or any of $R^2$ and $R^3$ is a hydrogen atom and the other one is a methyl group. More concrete examples thereof include (mono, di)(n-propyl)phosphoric acid, (mono, di)isopropylphosphoric acid, (mono, di)(n-butyl)phosphoric acid, (mono, di)(n-pentyl)phosphoric acid, (mono, di)(n-hexyl)phosphoric acid, (mono, di)(n-heptyl)phosphoric acid, (mono, di)(n-octyl)phosphoric acid, (mono, di)(2-ethylhexyl)phosphoric acid, (mono, di)(n-nonyl)phosphoric acid, (mono, di)(n-decyl)phosphoric acid, (mono, di)isodecylphosphoric acid, (mono, di)(n-undecyl)phosphoric acid, (mono, di)(n-dodecyl)phosphoric acid, (mono, di)(n-tridecyl)phosphoric acid, (mono, di)(n-tetradecyl)phosphoric acid, (mono, di)(n-pentadecyl)phosphoric acid, (mono, di)(n-hexadecyl)phosphoric acid, (mono, di)(3-oxahexyl)phosphoric acid, (mono, di)(3-oxaheptyl)phosphoric acid, (mono, di)(3-oxaoctyl)phosphoric acid, (mono, di)(3-oxanonyl) phosphoric acid, (mono, di)(3-oxaundecyl)phosphoric acid, (mono, di)(3-oxamidecyl)phosphoric acid, (mono, di)(3-oxapentadecyl)phosphoric acid, (mono, di)(3-oxaheptadecyl) phosphoric acid, (mono, di)(3-oxanonadecyl)phosphoric acid, (mono, di)(1-methyl-3-oxaheptyl)phosphoric acid, (mono, di)(1,2-dimethyl-3-oxaheptyl)phosphoric acid, (mono, di)(1-methyl-3-oxamidecyl)phosphoric acid, (mono, di)(3,6-dioxadecyl)phosphoric acid, (mono, di)(3,6-dioxatetradecyl)phosphoric acid, (mono, di)(3,6-dioxahexadecyl) phosphoric acid, (mono, di)(3,6-dioxaoctadecyl)phosphoric acid, (3,6-dioxaeicosyl)phosphoric acid, (3,6-dioxadocosyl) phosphoric acid, (mono, di)(1,4-dimethyl-3,6-dioxadecyl) phosphoric acid, (mono, di)(3,6,9-trioxamidecyl)phosphoric acid, (mono, di)(3,6,9-trioxaheptadecyl)phosphoric acid, (mono, di)(3,6,9-trioxaheneicosyl)phosphoric acid, (mono, di)(1,4,7-trimethyl-3,6,9-trioxamidecyl)phosphoric acid, (mono, di)(3,6,9,12-tetraoxahexadecyl)phosphoric acid, (mono, di)(3,6,9,12-tetraoxaoctadecyl)phosphoric acid, (mono, di)(3,6,9,12-tetraoxaeicosyl)phosphoric acid, (mono, di)(3,6,9,12-tetraoxadocosyl)phosphoric acid, (mono, di)(3,6,9,12-tetraoxatetracosyl)phosphoric acid, (mono, di)(1,4,7,10-tetramethyl-3,6,9,12-tetraoxahexadecyl)phosphoric acid and the like.

A process for preparing the internal mold release agent for the production of polythiourethane optical materials of the present invention is not particularly limited. In the present invention, the internal mold release agent can be obtained by mixing and reacting an acidic phosphate ester compound with, target metal powder.

When the internal mold release agent of the present invention is obtained by mixing the acidic phosphate ester compound with target metal powder, its reaction temperature is properly determined by the reactivity of the acidic phosphate ester with metal powder. When the mixture is a liquid after the reaction is carried out, it may be subjected to a filtration process such as under an applied pressure, a reduced pressure or the like.

The polythiourethane optical material composition of the present invention contains one or two or more isocyanates selected from the group consisting of isocyanate compounds and isothiocyanate compounds, and one or two or more active hydrogen compounds each having a mercapto group as main ingredients, and is a composition containing the aforementioned internal mold release agent for the production of polythiourethane optical materials. For the purpose of modification of the polythiourethane resin, a hydroxy compound may also be added.

In the present invention, concrete examples of preferable isocyanate compound include monofunctional isocyanate compounds such as methyl isocyanate, ethyl isocyanate, n-propyl isocyanate, isopropyl isocyanate, n-butyl isocyanate, sec-butyl isocyanate, tert-butyl isocyanate, pentyl isocyanate, hexyl isocyanate, heptyl isocyanate, octyl isocyanate, decyl isocyanate, lauryl isocyanate, myristyl isocyanate, octadecyl isocyanate, 3-pentyl isocyanate, 2-ethylhexyl isocyanate, 2,3-dimethylcyclohexyl isocyanate, 2-methoxyphenyl isocyanate, 4-methoxyphenyl isocyanate, α-methylbenzyl isocyanate, phenylethyl isocyanate, phenyl isocyanate, o-, m-, p-tolyl isocyanate, cyclohexyl isocyanate, benzyl isocyanate, isocyanatomethyl bicycloheptane and the like;

aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl)carbonate, bis(isocyanatoethyl) ether, lysine diisocyanatomethyl ester, lysine triisocyanate and the like;

alicyclic polyisocyanate compounds such as isophorone diisocyanate, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate, 2,5-bis(isocyanatomethyl)bicyclo-[2,2,1]-heptane, 2,6-bis(isocyanatomethyl)-bicyclo-[2,2,1]-heptane, 3,8-bis(isocyanatomethyl) tricyclodecane, 3,9-bis(isocyanatomethyl)tricyclodecane, 4,8-bis(isocyanatomethyl)tricyclodecane, 4,9-bis(isocyanatomethyl)tricyclodecane and the like;

aromatic polyisocyanate compounds such as m-xylylene diisocyanate, o-xylylene diisocyanate, p-xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis (isocyanatomethyl)diphenyl ether, phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis (isocyanatophenyl)ethylene, 3,3-dimethoxybiphenyl-4,4-diisocyanate, phenylisocyanatoethyl isocyanate, hexahydrobenzene diisocyanate, hexahydrodiphenylmethane-4,4-diisocyanate, bis(isocyanatoethyl)phthalate, mesitylylene triisocyanate, 2,6-di(isocyanatomethyl)furan and the like;

sulfur-containing aliphatic polyisocyanate compounds such as bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, 1,5-diisocyanato-2-isocyanatomethyl-3-thiapentane and the like;

sulfur-containing aromatic polyisocyanate compounds such as diphenylsulfide-2,4-diisocyanate, diphenylsulfide-4,4-diisocyanate, 3,3-dimethoxy-4,4-diisocyanatodibenzylthioether, bis(4-isocyanatomethylbenzene)sulfide, 4,4-methoxybenzenethioethylene glycol-3,3-diisocyanate, diphenyldisulfide-4,4-diisocyanate, 2,2-dimethyldiphenyldisulfide-5,5-diisocyanate, 3,3-dimethyldiphenyldisulfide-5,5-diisocyanate, 3,3-dimethyldiphenyldisulfide-6,6-diisocyanate, 4,4-dimethyldiphenyldisulfide-5,5-diisocyanate, 3,3-dimethoxydiphenyldisulfide-4,4-diisocyanate, 4,4-dimethoxydiphenyldisulfide-3,3-diisocyanate and the like; and sulfur-containing heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isocyanatomethyl)-2-methyl-1,3-dithiolane and the like, but are not restricted to these exemplified compounds alone.

Their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed. These isocyanate compounds may be used singly, or two or more compounds may be used in combination.

In the present invention, an isothiocyanate compound is selected from an isothiocyanate compound and an isothiocyanate compound having an isocyanate group. Concrete examples of preferable isothiocyanate compound include monofunctional isothiocyanate compounds such as methyl isothiocyanate, ethyl isothiocyanate, n-propyl isothiocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m-, p-tolyl isothiocyanate, cyclohexyl isothiocyanate, benzyl isothiocyanate, isothiocyanatomethyl bicycloheptane and the like;

aliphatic polyisothiocyanate compounds such as hexamethylene diisothiocyanate, 2,2-dimethylpentane diisothiocyanate, 2,2,4-trimethylhexane diisothiocyanate, butene diisothiocyanate, 1,3-butadiene-1,4-diisothiocyanate, 2,4,4-trimethylhexamethylene diisothiocyanate, 1,6,11-undecane triisothiocyanate, 1,3,6-hexamethylene triisothiocyanate, 1,8-diisothiocyanato-4-isothiocyanatemethyloctane, bis(isothiocyanatoethyl)carbonate, bis(isothiocyanatoethyl) ether, lysine diisothiocyanatomethyl ester, lysine triisothiocyanate, xylylene diisothiocyanate, bis(isothiocyanatoethyl)benzene, bis(isothiocyanatopropyl)benzene, α,α,α',α'-tetramethylxylylene diisothiocyanate, bis(isothiocyanatobutyl)benzene, bis(isothiocyanatomethyl)naphthalene, bis(isothiocyanatomethyl)diphenyl ether, bis(isothiocyanatoethyl)phthalate, mesitylylene triisothiocyanate, 2,6-di(isothiocyanatomethyl)furan and the like;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, dicyclohexyldimethylmethane isothiocyanate, 2,2-dimethyldicyclohexylmethane isothiocyanate, 2,5-bis(isothiocyanatomethyl)bicyclo-[2,2,1]-heptane, 2,6-bis(isothiocyanatomethyl)bicyclo-[2,2,1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane and the like;

aromatic polyisothiocyanate compounds such as phenylene diisothiocyanate, tolylene diisothiocyanate, ethylphenylene diisothiocyanate, isopropylphenylene diisothiocyanate, dimethylphenylene diisothiocyanate, diethylphenylene diisothiocyanate, diisopropylphenylene diisothiocyanate, trimethylbenzene triisothiocyanate, benzene triisothiocyanate, biphenyl diisothiocyanate, toluidine diisothiocyanate, 4,4-diphenylmethane diisothiocyanate, 3,3-dimethyldiphenylmethane-4,4-diisothiocyanate, bibenzyl-4,4-diisothiocyanate, bis(isothiocyanatophenyl)ethylene, 3,3-dimethoxybiphenyl-4,4-diisothiocyanate, phenylisothiocyanatoethyl isothiocyanate, hexahydrobenzene diisothiocyanate, hexahydrodiphenylmethane-4,4-diisothiocyanate and the like;

sulfur-containing aliphatic polyisothiocyanate compounds such as bis(isothiocyanatoethyl)sulfide, bis(isothiocyanatopropyl)sulfide, bis(isothiocyanatohexyl)sulfide, bis(isothiocyanatomethyl)sulfone, bis(isothiocyanatomethyl)disulfide, bis(isothiocyanatopropyl)disulfide, bis(isothiocyanatomethylthio)methane, bis(isothiocyanatoethylthio)methane, bis(isothiocyanatoethylthio)ethane, bis(isothiocyanatomethylthio)ethane, 1,5-diisothiocyanato-2-isothiocyanatomethyl-3-thiapentane and the like;

sulfur-containing aromatic polyisothiocyanate compounds such as diphenylsulfide-2,4-diisothiocyanate, diphenylsulfide-4,4-diisothiocyanate, 3,3-dimethoxy-4,4-diisothiocyanatodibenzylthioether, bis(4-isothiocyanatomethylbenzene)sulfide, 4,4-methoxybenzenethioethylene glycol-3,3-diisothiocyanate, diphenyldisulfide-4,4-diisothiocyanate, 2,2-dimethyldiphenyldisulfide-5,5-diisothiocyanate, 3,3-dimethyldiphenyldisulfide-5,5-diisothiocyanate, 3,3-dimethyldiphenyldisulfide-6,6-diisothiocyanate, 4,4-dimethyldiphenyldisulfide-5,5-diisothiocyanate, 3,3-dimethoxydiphenyldisulfide-4,4-diisothiocyanate, 4,4-dimethoxydiphenyldisulfide-3,3-diisothiocyanate and the like; and sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)

tetrahydrothiophene, 2,5-diisothiocyanato-1,4-dithiane, 2,5-bis(isothiocyanatomethyl)-1,4-dithiane, 4,5-diisothiocyanato-1,3-dithiolane, 4,5-bis(isothiocyanatomethyl)-1,3-dithiolane, 4,5-bis(isothiocyanatomethyl)-2-methyl-1,3-dithiolane and the like, but are not restricted to these exemplified compounds alone.

Their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed. These isothiocyanate compounds may be used singly, or two or more compounds may be used in combination.

Examples of the isothiocyanate compound having an isocyanate group include aliphatic or alicyclic compounds such as 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane and the like;

aromatic compounds such as 1-isocyanato-4-isothiocyanatobenzene, 4-methyl-3-isocyanato-1-isothiocyanatobenzene and the like;

heterocyclic compounds such as 2-isocyanato-4,5-diisothiocyanato-1,3,5-triazine and the like;

compounds containing an isothiocyanato group such as 4-isocyanato-4'-isothiocyanatodiphenylsulfide, 2-isocyanato-2'-isothiocyanatodiethyldisulfide and the like; and their compounds further containing a sulfur atom.

Furthermore, their halogen substituted compounds such as chlorine substituted compounds, bromine substituted compounds or the like, alkyl substituted compounds, alkoxy substituted compounds, nitro substituted compounds, prepolymer type modified products modified with polyhydric alcohols, carbodiimide modified products, urea modified products, biuret modified products, dimerization or trimerization reaction products or the like may be employed. These isocyanates may each independently be used, or two or more compounds may be used in combination.

The active hydrogen compound used in the present invention is selected from mercapto compounds and mercapto compounds each having a hydroxyl group.

Examples of the mercapto compound include aliphatic polythiol compounds such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, 1,2-dimercaptopropylmethyl ether, 2,3-dimercaptopropylmethyl ether, 2,2-bis(mercaptomethyl)-1,3-propanedithiol, bis(2-mercaptoethyl)ether, tetrakis(mercaptomethyl)methane and the like;

aliphatic polythiol compounds each having one or more ester bonds, such as 2,3-dimercaptosuccinic acid (2-mercaptoethyl ester), thiomalic acid bis(2-mercaptoethyl ester), 2,3-dimercapto-1-propanol(2-mercaptoacetate), 2,3-dimercapto-1-propanol(3-mercaptopropionate), 3-mercapto-1,2-propanediol bis(2-mercaptoacetate), 3-mercapto-1,2-propanediol bis(3-mercaptopropionate), diethylene glycol bis(2-mercaptoacetate), diethylene glycol bis(3-mercaptopropionate), ethylene glycol bis(2-mercaptoacetate), ethylene glycol bis(3-mercaptopropionate), trimethyloipropane tris(2-mercaptoacetate), trimethyloipropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerine tris(2-mercaptoacetate), glycerine tris(3-mercaptopropionate), 1,4-cyclohexanediol bis(2-mercaptoacetate), 1,4-cyclohexanediol bis(3-mercaptopropionate) and the like;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-dichlorobenzene-1,3-dithiol, 1,3-di(p-chlorophenyl)propane-2,2-dithiol, 3,4,5-triboromo-1,2-dimercaptobenzene, 2,3,4,6-tetrachlor-1,5-bis(mercaptomethyl)benzene and the like;

heterocyclic thiol compounds such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cylcohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and the like; and halogen substituted compounds thereof, but are not restricted to these exemplified compounds alone.

Furthermore, their halogen substituted compounds such as chlorine substituted compounds, bromine substituted compounds or the like may be employed. These mercapto compounds may be used singly, or two or more compounds may be used in combination.

Examples of the mercapto compound having one or more sulfide bonds in one molecule include aliphatic polythiol compounds such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio) ethane, 1,2-bis(2-mercaptoethylthio)ethane, 1,2-bis(3-mercaptopropylthio)ethane, 1,3-bis(mercaptomethylthio) propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, 2,5-dimercaptomethyl-2,5-dimethyl-1,4-dithiane and the like;

aliphatic polythiols each having one or more ester bonds such as thioglycolic acid ester and mercaptopropionic acid ester thereof, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), thiodipropionic acid bis(2,3-dimercaptopropyl ester), dithiodipropionic acid bis(2,3-dimercaptopropyl ester) and the like;

heterocyclic polythiol compounds such as 3,4-thiophenedithiol, bismuthiol and the like;

1,1,3,3-tetrakis(mercaptomethylthio)propane, 1,1,2,2-tetrakis(mercaptomethylthio)ethane, 4,6-bis(mercaptomethylthio)-1,3-dithiane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithietane, 1,1,9,9-tetrakis(mercaptomethylthio)-5-(3,3-bis(mercaptomethylthio)-1-thiapropyl)3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiamidecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-[bis(mercaptomethylthio)methyl]-3,4,12,13-tetrakis(mercaptomethylthio)-1,15-dimercapto-2,5,7,9,11,14-hexathiapentadecane, 4,6-bis[3,5-bis(mercaptomethylthio)-7-mercapto-2,6-dithiaheptylthio]-1,3-dithiane, 4-[3,5-bis(mercaptomethylthio)-7-mercapto-2,6-dithiaheptylthio]-6-mercaptomethylthio-1,3-dithiane, 1,1-bis[4-(6-mercaptomethylthio)-1,3-dithianylthio]-1,3-bis(mercaptomethylthio)propane, 1-[4-(6-mercaptomethylthio)-1,3-dithianylthio]-3-[2,2-bis(mercaptomethylthio)ethyl]7,9-bis(mercaptomethylthio)-2,4,6,10-tetrathiaundecane, 1,5-bis[4-(6-mercaptomethylthio)-1,3-dithianylthio]-3-[2-(1,3-dithietanyl)]methyl-2,4-dithiapentane, 4,6-bis{3-[2-(1,3-dithietanyl)]methyl-5-mercapto-2,4-dithiapentyl}1,3-dithiane, 4,6-bis[4-(6-mercaptomethylthio)-1,3-dithianylthio]-6-[4-(6-mercaptomethylthio)-1,3-dithianylthio]-1,3-dithiane, 3-[2-(1,3-dithietanyl)]methyl-7,9-bis(mercaptomethylthio)-1,11-dimercapto-2,4,6,10-tetrathiaundecane, 9-[2-(1,3-dithietanyl)]methyl-3,5,13,15-tetrakis(mercaptomethylthio)-1,17-dimercapto-2,6,8,10,12,16-hexathiaheptadecane, 3-[2-(1,3-dithietanyl)]methyl-7,9,13,15-tetrakis(mercaptomethylthio)-1,17-dimercapto-2,4,6,10,12,16-hexathiaheptadecane, 3,7-bis[2-(1,3-dithietanyl)]methyl-1,9-dimercapto-2,4,6,8-tetrathianonane, 4-[3,4,8,9-tetrakis(mercaptomethylthio)-11-mercapto-2,5,7,10-tetrathiaundecyl]-5-mercaptomethylthio-1,3-dithiolane, 4,5-bis[3,4-bis(mercaptomethylthio)-6-mercapto-2,5-dithiahexylthio]-1,3-dithiolane, 4-[3,4-bis(mercaptomethylthio)-6-mercapto-2,5-dithiahexylthio]-5-mercaptomethylthio-1,3-dithiolane, 4-[(3-bis(mercaptomethylthio)methyl-5,6-bis(mercaptomethylthio)-8-mercapto-2,4,7-trithiaoctyl]-5-mercaptomethylthio-1,3-dithiolane, 2-{bis[3,4-bis(mercaptomethylthio)-6-mercapto-2,5-dithiahexylthio]methyl}-1,3-dithietane, 2-[3,4-bis(mercaptomethylthio)-6-mercapto-2,5-dithiahexylthio]mercaptomethylthiomethyl-1,3-dithietane, 2-[3,4,8,9-tetrakis(mercaptomethylthio)-11-mercapto-2,5,7,10-tetrathiaundecylthio]mercaptomethylthiomethyl-1,3-dithietane, 2-[3-bis(mercaptomethylthio)methyl-5,6-bis(mercaptomethylthio)-8-mercapto-2,4,7-trithiaoctyl]mercaptomethylthiomethyl-1,3-dithietane, 4,5-bis{1-[2-(1,3-dithietanyl)]-3-mercapto-2-thiapropylthio}-1,3-dithiolane, 4-{1-[2-(1,3-dithietanyl)]-3-mercapto-2-thiapropylthio}-5-[1,2-bis(mercaptomethylthio)-4-mercapto-3-thiabutylthio]-1,3-dithiolane, 2-{bis[4-(5-mercaptomethylthio-1,3-dithioranyl)thio]methy}-1,3-dithietane, 4-[4-(5-mercaptomethylthio-1,3-dithioranyl)thio]-5-{1-[2-(1,3-dithietanyl)]-3-mercapto-2-thiapropylthio}-1,3-dithiolane and polythiol compounds having dithioacetal or dithioketal skeleton such as their oligomer and the like; and tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl](mercaptomethylthio)methane, tris[4,4-bis(mercaptomethylthio)-1,3-dithiabutyl]methane, 2,4,6-tris (mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl-1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-2-thiapropyl]methane, tris[4,4-bis(mercaptomethylthio)-3-thiabutyl]methane, 2,4,6-tris[3,3-bis(mercaptomethylthio)-2-thiapropyl]-1,3,5-tri thiacyclohexane, tetrakis[3,3-bis(mercaptomethylthio)-2-thiapropyl]methane and polythiol compounds having ortho trithioformic ester skeleton such as their oligomer, but are not restricted to these exemplified compounds alone.

Furthermore, their halogen substituted compounds such as chlorine substituted compounds, bromine substituted compounds or the like may be employed. These thiol compounds each having a sulfide bond may be used singly, or two or more compounds may be used in combination.

Furthermore, examples of the mercapto compound having a hydroxyl group include 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenyl sulfone, 2-(2-mercaptoethylthio)ethanol, dihydroxyethylsulfide mono(3-mercaptopropionate), dimercaptoethane mono(salicylate), hydroxyethylthiomethyl-tris(mercaptoethylthio)methane and the like.

Furthermore, halogen substituted compounds such as chlorine substituted compounds, bromine substituted compounds or the like of the active hydrogen compounds may be employed. These compounds may be used singly, or two or more compounds may be used in combination.

The polythiourethane resin of the present invention contains one or two or more isocyanates selected from the group consisting of isocyanate compounds and isothiocyanate compounds, and one or two or more active hydrogen compounds each having a mercapto group as main ingredients. However, for the purpose of modification of the polythiourethane resin, a hydroxy compound, an amine compound, an epoxy resin, an organic acid and anhydrides thereof, an olefin compound containing a (meth)acrylate compound and the like, or the like may also be added. Herein, the resin modifier is a compound by which physical properties such as refractive index, Abbe number, heat resistance, specific gravity or the like, and mechanical strength such as impact resistance or the like of the polythiourethane resin are adjusted or improved.

Examples of the hydroxy compound used as a resin modifier of the polythiourethane resin of the present invention include diethylene glycol, triethylene glycol, 1,3-propanediol, dipropylene glycol, tripropylene glycol, 1,4-butanediol, 1,3-butanediol, 1,5-pentanediol, 1,4-pentanediol, 1,3-pentanediol, 1,6-hexanediol, 1,5-hexanediol, 1,4-hexanediol, 1,3-hexanediol, 1,7-heptanediol, 1,8-octanediol, thiodiethanol, dithiodiethanol, thiodipropanol, dithiodipropanol and their oligomers and the like, but are not restricted to these exemplified compounds alone. These alcohol compounds may be used singly, or two or more compounds may be used in combination.

Examples of the amine compound which can be added as a resin modifier include monofunctional primary amine compounds such as ethylamine, n-propylamine, isopropylamine, n-butylamine, sec-butylamine, ter-butylamine, pentylamine, hexylamine, heptylamine, octylamine, decylamine, laurylamine, myristylamine, 3-pentylamine, 2-ethylhexylamine, 1,2-dimethylhexylamine, allylamine, aminomethyl bicycloheptane, cyclopentylamine, cyclohexylamine, 2,3-dimethylcyclohexylamine, aminomethylcyclohexane, aniline, benzylamine, phenethylamine, 2,3- or 4-methylbenzylamine, o-, m- or p-methylaniline, o-, m- or p-ethylaniline, aminomorpholine, naphthylamine, furfurylamine, α-aminodiphenylmethane, toluidine, aminopyridine, aminophenol, aminoethanol, 1-aminopropanol, 2-aminopropanol, aminobutanol, aminopentanol, aminohexanol, methoxyethylamine, 2-(2-aminoethoxy)ethanol, 3-ethoxypropylamine, 3-propoxypropylamine, 3-butoxypropylamine, 3-isopropoxypropylamine, 3-isobutoxypropylamine, 2,2-diethoxyethylamine and the like;

primary polyamine compounds such as ethylene diamine, 1,2- or 1,3-diaminopropane, 1,2-, 1,3- or 1,4-diaminobutane, 1,5-diaminopentane, 1,6-diaminohexane, 1,7-diaminoheptane, 1,8-diaminooctane, 1,10-diaminodecane, 1,2-, 1,3- or 1,4-diaminocyclohexane, o-, m- or p-diaminobenzene, 3,4- or 4,4'-diaminobenzophenone, 3,4- or 4,4'-diaminodiphenyl ether, 4,4'-diaminodiphenyl methane, 4,4'-diaminodiphenyl sulfide, 3,3'- or 4,4'-diaminodiphenyl sulfane, 2,7-diaminofluorene, 1,5-, 1,8- or 2,3-diaminonaphthalene, 2,3-, 2,6- or 3,4-diaminopyridine, 2,4- or 2,6-diaminotoluene, m- or p-xylylenediamine, isophorone diamine, diaminomethyl bicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, N-aminopropylmorpholine and the like;

monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, morpholine and the like; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine and the like, but are not restricted to these exemplified compounds alone. These amine compounds may be used singly, or two or more compounds may be used in combination.

Examples of the epoxy resin which can be added as a resin modifier include a phenol type epoxy compound obtained by the condensation reaction of a polyhydric phenol compound such as bisphenol A glycidyl ether or the like with an epihalohydrin compound, an alcohol type epoxy compound obtained by condensation of a polyhydric alcohol compound such as hydrogenated bisphenol A glycidyl ether with an epihalohydrin compound, a glycidyl ester type epoxy compound obtained by condensation of a polyhydric organic acid compound such as 3,4-epoxycyclohexylmethyl-3',4'-epoxycyclohexane carboxylate, 1,2-hexahydrophthalic acid diglycidyl ester or the like with an epihalohydrin compound, an amine type epoxy compound obtained by condensation of primary and secondary diamine compounds with an epihalohydrin compound, an aliphatic polyhydric epoxy compound such as vinylcyclohexene diepoxide or the like, but are not restricted these exemplified compounds alone. These epoxy resins may be used singly, or two or more kinds thereof may be used in combination.

Examples of the organic acid and its anhydride which can be added as a resin modifier include thiodiglycolic acid, thiodipropionic acid, dithiodipropionic acid, phthalic anhydride, hexahydrophthalic anhydride, methylhexahydrophthalic anhydride, methyltetrahydrophthalic anhydride, methyl norbornene anhydride, methylnorbornane anhydride, maleic anhydride, trimellitic anhydride, pyromellitic dianhydride and the like, but are not restricted to these exemplified compound alone. These organic acids and anhydrides thereof may be used singly, or two or more kinds thereof may be used in combination.

Examples of the olefin compound which can be added as a resin modifier include (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentylglycol diacrylate, neopentylglycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthio acrylate, methylthio methacrylate, phenylthio acrylate, benzylthio methacrylate, xylylenedithiol diacrylate, xylylenedithiol dimethacrylate, mercaptoethyl sulfide diacrylate, mercaptoethylsulfide dimethacrylate and the like;

allyl compounds such as allyl glycidyl ether, diallyl phthalate, diallyl terephthalate, diallyl isophthalate, diallyl carbonate, diethylene glycol bisallylcarbonate and the like; and vinyl compounds such as styrene, chlorostyrene, methylstyrene, bromostyrene, dibromostyrene, divinylbenzene, 3,9-divinylspirobi(m-dioxane) and the like, but are not restricted to these exemplified compounds alone. These olefin compounds may be used singly, or two or more compounds may be used in combination.

In the production of the polythiourethane optical material of the present invention, the ratio of isocyanates and the active hydrogen compounds used as raw materials including the hydroxyl compounds used as modifier, may be such that the functional group molar ratio, (NCO+NCS)/(SH+OH), is usually in the range of 0.5 to 3.0, preferably in the range of 0.6 to 2.0 and further preferably in the range of 0.8 to 1.2.

For the production of the polythiourethane optical material of the present invention, a variety of substances such as a chain extender, a cross-linking agent, a light stabilizer, an ultraviolet absorber, an anti-oxidant, an anti-coloring agent, an oil-soluble dye, filler, an adhesion improving agent or the like may be added, depending on the purpose, as in the known molding methods.

The internal mold release agent of the present invention is obtained by adding acidic phosphate ester as much as the amount added thereof into a polymerization composition. So, when the amount added is excessively high, lenses might be easily clouded. On the other hand, when the amount added is small, a resin becomes difficult to be released from a mold. The internal mold release agent of the present invention is preferably added in an amount range of 100 to 10,000 ppm based on the total amount of the isocyanates and the active hydrogen compound. However, by taking the content of metal in the internal mold release agent, other polymerization conditions and the like into consideration, even when the amount of the internal mold release agent added exceeds 10,000 ppm, polymerization can be conducted without causing white turbidity of the lens with no problem. Furthermore, even when the amount is less than 100 ppm, the resin can be released from the mold without any problem. So, the range of the internal mold release agent of the present invention to be added is not definitely from 100 ppm to 10,000 ppm.

In the present invention, when isocyanates and the active hydrogen compounds are mixed with an internal mold release agent composition and other additives before polymerization to produce a polymerization composition, the procedure of the internal mold release agent composition of the present invention and other additives to be added is different depending on the solubility into a monomer. However, the internal mold release agent composition and other additives may be previously added to isocyanates and dissolved therein, added to the active hydrogen compounds and dissolved therein, or added to a mixture of the isocyanates and the active hydrogen compounds and dissolved therein. Alternatively, they may be dissolved in a part of the monomer in order to prepare a master solution, and then the solution may be added. The procedure of addition is not restricted to these exemplified methods, and properly selected depending on the operability, safety, expediency or the like. Preferably, the internal mold release agent composition of the present invention and other additives are previously added to isocyanates and dissolved therein, or dissolved in a part of isocyanates to prepare a master solution and then the solution is added.

When the isocyanates and the active hydrogen compounds are mixed with the internal mold release agent and other additives to produce a polymerization composition, the temperature at that time is preferably not more than 25 degree centigrade from the viewpoint of the pot life of the composition. However, when the solubility of the internal mold release agent of the present invention and other additives into the monomer is not good, the internal mold release agent and other additives can be previously heated and dissolved in the monomer isocyanates or active hydrogen compounds, or in a monomer mixture.

As a typical polymerization method for obtaining the polythiourethane resin (for example, plastic lens) from the thus obtained polymerization composition, casting polymerization can be cited. Namely, the polymerization composition according to the present invention is injected between molds held by a gasket, tapes or the like. At this time, as required, the resulting material may be subjected to a degassing process under a reduced pressure or a filtration process such as under an applied pressure, a reduced pressure or the like. Next, it can be subjected to curing by heating in a heating apparatus such as an oven or in water, and then the resin can be taken out from the mold.

Heat polymerization conditions of the polymerization composition injected into the mold significantly vary depending on composition of the polymerizable composition of the present invention, shape of the mold or the like and therefore are not restricted. However, polymerization is conducted at a temperature of about −50 to 200 degree centigrade over 1 to 100 hours. In some cases, the composition is preferably polymerized by keeping or gradually raising the temperature in the range of 10 to 150 degree centigrade for 1 to 24 hours.

In addition, the resin which has been taken out from the mold, may be, if necessary, annealed or the like. The annealing temperature is usually from 50 to 200 degree centigrade, more preferably from 90 to 150 degree centigrade and further preferably from 100 to 130 degree centigrade.

The polythiourethane resin produced according to the present invention is a resin excellent in color. The obtained polythiourethane resin can be obtained as a molded article in various shapes by changing the mold at the time of casting polymerization and can be suitably used as a plastic lens, particularly a plastic lens material for spectacles.

Furthermore, in the plastic lens material for spectacles produced according to the present invention, for purposes of anti-reflection, granting high hardness, improving wear resistance, improving chemical resistance, granting anti-fogging property, granting fashionability or the like, if necessary, physical or chemical processes such as surface polishing, antistatic process, hard coat process, non-reflective coat process, tinting process, photochromic process or the like can be performed.

EXAMPLES

The present invention is now illustrated in detail below with reference to Examples. However, the present invention is not restricted to these Examples.

Incidentally, the concentrations of the metal (Zn) in the obtained internal mold release agents of the present invention and tests of the performance (refractive index, Abbe number and heat resistance) of the obtained lens were evaluated by the following testing method.

Concentration of metal (Zn): Measured using ICP-AES (inductively coupled plasma-atomic emission spectrometer).

Refractive index (ne) and Abbe number (ve): Measured at 20 degree centigrade using a Pulfrich refractometer.

Heat resistance (Tg): Tg (degree centigrade) of the TMA penetration method (load: 50 g, pinpoint: 0.5 mmΦ, temperature elevation rate: 10 degree centigrade/min) was measured as heat resistance.

Color (YI: Yellow Index): Using a colorimeter (CR-200) manufactured by Minolta, a resin color (YI) value was measured.

The resin color (YI) value was measured by preparing a circular flat plate having a thickness of 9 mm and a diameter of ϕ 75 mm.

Transparency: It was visually observed under a high pressure mercury-vapor lamp. x represents those with turbidity, while ○ represents those with excellent transparency.

Releasability: ○ represents a case where the resin was easily released from the mold, Δ represents a case where an excessive force was needed, and x represents a case where the mold and the resin were damaged or deformed.

Weather resistance: The change of the resin color (YI) value was observed by irradiating the resin with an artificial sunlight (illuminance: 88400 lx/h) for 7 days. The smaller an increase in the YI value (ΔYI) was, the better light stability was.

Example 1

To 10 g of butoxyethyl acid phosphate (Johoku Chemical Co., Ltd., product name: JP-506H) as an acidic phosphate ester compound was added 0.17 g of zinc powder of 75 to 150 μm (Wako Pure Chemical Industries, Ltd., Catalog No. 262-01581). The resulting solution was stirred at room temperature for 24 hours, mixed and dissolved, and then filtered through a 3-μm PTFE filter to obtain an internal mold release agent 1 as a yellow transparent liquid. The Zn concentration in the obtained internal mold release agent 1 was 1.6 weight %.

Example 2

To 10 g of an acidic phosphate ester compound (Toho Chemical Industry Co., Ltd., product name: RA-600) was added 0.17 g of zinc powder of 75 to 150 μm (Wako Pure Chemical Industries, Ltd., Catalog No. 262-01581). The resulting solution was warmed up in a water bath at not more than 70 degree centigrade, and stirred for 24 hours, mixed and dissolved. Then, at a warm state, the mixture was filtered through a 3-μm PTFE filter to obtain an internal mold release agent 2 as a very lightly yellow transparent liquid. The Zn concentration in the obtained internal mold release agent 2 was 1.2 weight %.

Example 3

To 10 g of an acidic phosphate ester compound (STEPAN Company, product name: Zelec UN) was added 0.10 g of zinc powder of 75 to 150 μm (Wako Pure Chemical Industries, Ltd., Catalog No. 262-01581). The resulting solution was stirred at room temperature for 72 hours, mixed and dissolved, and then filtered through a 3-μm PTFE filter to obtain an internal mold release agent 3 as a pale yellow transparent liquid. The Zn concentration in the obtained internal mold release agent 3 was 0.9 weight %.

Example 4

36.4 g of m-xylylene diisocyanate, 0.035 g of an ultraviolet absorber (Kyodo Chemical Co., Ltd., product name: viosorb 583) and 0.071 g of the internal mold release agent 1 obtained in Example 1 were mixed and dissolved at 20 degree centigrade to give a homogeneous solution. To this homogeneous solution was added 33.6 g of 4-mercaptomethyl-1,8-dimercapto-3,6-dithiaoctane, and the resulting solution was mixed and dissolved at 20 degree centigrade. The mixed solution was degassed under 400 Pa for 1 hour, and then filtered through a 1-μm PTFE filter. Then, the resulting solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.3, heat resistance (Tg) of 87.8 degree centigrade, and color (YI) of 5.4. It was suitable as an optical transparent resin. Furthermore, weather resistance (ΔYI) was 1.2. The evaluation results were shown in Table 1.

Example 5

36.4 g of m-xylylene diisocyanate, 0.035 g of an ultraviolet absorber (Kyodo Chemical Co., Ltd., product name: viosorb 583) and 0.071 g of the internal mold release agent 2 obtained in Example 2 were mixed and dissolved at 20 degree centigrade to give a homogeneous solution. To this homogeneous solution was added 33.6 g of 4-mercaptomethyl-1,8-dimercapto-3,6-dithiaoctane, and the resulting solution was mixed and dissolved at 20 degree centigrade. The mixed solution was degassed under 400 Pa for 1 hour, and then filtered through a 1-μm PTFE filter. Then, the resulting solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.4, heat resistance (Tg) of 87.8 degree centigrade, and color (YI) of 5.4. It was suitable as an optical transparent resin. Furthermore, weather resistance (ΔYI) was 1.1. The evaluation results were shown in Table 1.

Example 6

36.4 g of m-xylylene diisocyanate, 0.035 g of an ultraviolet absorber (Kyodo Chemical Co., Ltd., product name: viosorb 583) and 0.076 g of the internal mold release agent 3 obtained in Example 3 were mixed and dissolved at 20 degree centigrade to give a homogeneous solution. To this homogeneous solution was added 33.6 g of 4-mercaptomethyl-1,8-dimercapto-3,6-dithiaoctane, and the resulting solution was mixed and dissolved at 20 degree centigrade. The mixed solution was degassed under 400 Pa for 1 hour, and then filtered through a 1-μm PTFE filter. Then, the resulting solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.4, heat resistance (Tg) of 88.9 degree centigrade, and color (YI) of 5.3. It was suitable as an optical transparent resin. Furthermore, weather resistance (ΔYI) was 1.0. The evaluation results were shown in Table 1.

Example 7

To 10 g of butoxyethyl acid phosphate (Johoku Chemical Co., Ltd., product name: JP-506H) as an acidic phosphate ester compound were added 0.43 g of zinc powder of 75 to 150 μm (Wako Pure Chemical Industries, Ltd., Catalog No. 262-01581) and 10 g of acetone. The resulting solution was warmed up in a water bath at 60 degree centigrade, and stirred for 24 hours, mixed and dissolved. Then, the mixture was concentrated under a reduced pressure to obtain 10.33 g of a yellow transparent liquid. The yellow transparent liquid was filtered through a 1-μm PTFE filter to obtain an internal mold release agent 4. The Zn concentration in the obtained internal mold release agent 4 was 4.0 weight %.

Example 8

To 10 g of butoxyethyl acid phosphate (Johoku Chemical Co., Ltd., product name: JP-506H) as an acidic phosphate ester compound were added 0.58 g of zinc powder of 75 to 150 μm (Wako Pure Chemical Industries, Ltd., Catalog No. 262-01581) and 10 g of acetone. The resulting solution was warmed up in a water bath at 60 degree centigrade, and stirred for 24 hours, mixed and dissolved. Then, the mixture was concentrated under a reduced pressure to obtain 10.33 g of a yellow transparent liquid. The yellow transparent liquid was filtered through a 1-μm PTFE filter to obtain an internal mold release agent 5. The Zn concentration in the obtained internal mold release agent 5 was 5.1 weight %.

Example 9

To 10 g of butoxyethyl acid phosphate (Johoku Chemical Co., Ltd., product name: JP-506H) as an acidic phosphate ester compound were added 1.00 g of zinc powder of 75 to 150 μm (Wako Pure Chemical Industries, Ltd., Catalog No 262-01581) and 10 g of acetone. The resulting solution was warmed up in a water bath at 60 degree centigrade, and stirred for 24 hours, mixed and dissolved. Then, the mixture was concentrated under a reduced pressure to obtain 10.70 g of a pale yellow transparent liquid with high viscosity. The pale yellow transparent liquid was filtered through a 3-μm PTFE filter to obtain an internal mold release agent 6. The Zn concentration in the obtained internal mold release agent 6 was 8.5 weight %.

Example 10

To 10 g of butoxyethyl acid phosphate (Johoku Chemical Co., Ltd., product name: JP-506H) as an acidic phosphate ester compound were added 1.23 g of zinc powder of 75 to 150 μm (Wako Pure Chemical Industries, Ltd., Catalog No. 262-01581) and 10 g of acetone. The resulting solution was warmed up in a water bath at 60 degree centigrade, and stirred for 24 hours, mixed and dissolved. Then, the mixture was concentrated under a reduced pressure to obtain 10.77 g of a pale yellow transparent liquid with high viscosity. The pale yellow transparent liquid was filtered through a 3-μm PTFE filter to obtain an internal mold release agent 7. The Zn concentration in the obtained internal mold release agent 7 was 10.0 weight %.

Example 11

36.4 g of m-xylylene diisocyanate, 0.035 g of an ultraviolet absorber (Kyodo Chemical Co., Ltd., product name: viosorb 583) and 0.070 g of the internal mold release agent 4 obtained in Example 7 were mixed and dissolved at 20 degree centigrade to give a homogeneous solution. To this homogeneous solution was added 33.6 g of 4-mercaptomethyl-1,8-dimercapto-3,6-dithiaoctane, and the resulting solution was mixed and dissolved at 20 degree centigrade. The mixed solution was degassed under 400 Pa for 1 hour, and then filtered through a 1-μm PTFE filter to obtain a solution. The obtained solution was sufficiently fluid to flow. Then, the solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.4, heat resistance (Tg) of 86.8 degree centigrade, and color (YI) of 6.0. It was suitable as an optical transparent resin. Furthermore, weather resistance ($\Delta YI$) was 1.5. The evaluation results were shown in Table 1.

Example 12

36.4 g of m-xylylene diisocyanate, 0.035 g of an ultraviolet absorber (Kyodo Chemical Co., Ltd., product name: viosorb 583) and 0.070 g of the internal mold release agent 5 obtained in Example 8 were mixed and dissolved at 20 degree centigrade to give a homogeneous solution. To this homogeneous solution was added 33.6 g of 4-mercaptomethyl-1,8-dimercapto-3,6-dithiaoctane, and the resulting solution was mixed and dissolved at a temperature of from 0 to 10 degree centigrade. At the same temperature, the mixed solution was degassed under 400 Pa for 1 hour, and then filtered through a 1-μm PTFE filter to obtain a solution. The obtained solution was sufficiently fluid to flow. Then, the solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.2, heat resistance (Tg) of 86.7 degree centigrade, and color (YI) of 5.9. It was suitable as an optical transparent resin. Furthermore, weather resistance ($\Delta YI$) was 1.3. The evaluation results were shown in Table 1.

Example 13

36.4 g of m-xylylene diisocyanate, 0.035 g of an ultraviolet absorber (Kyodo Chemical Co., Ltd., product name: BioSorb 583) and 0.070 g of the internal mold release agent 6 obtained in Example 9 were mixed and dissolved at 20 degree centigrade to give a homogeneous solution. To this homogeneous solution were added 33.6 g of 4-mercaptomethyl-1,8-dimercapto-3,6-dithiaoctane, and the resulting solution was mixed and dissolved at a temperature of from 0 to 10 degree centigrade. At the same temperature, the mixed solution was degassed under 400 Pa for 1 hour, and then filtered through a 1-μm PTFE filter to obtain a solution. The obtained solution was sufficiently fluid to flow. Then, the solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.0, heat resistance (Tg) of 87.2 degree centigrade, and color (YI) of 5.7. It was suitable as an optical transparent resin. Furthermore, weather resistance ($\Delta YI$) was 1.7. The evaluation results were shown in Table 1.

Example 14

36.4 g of m-xylylene diisocyanate, 0.035 g of an ultraviolet absorber (Kyodo Chemical Co., Ltd., product name: viosorb 583) and 0.035 g of the internal mold release agent 7 obtained in Example 10 were mixed and dissolved at 20 degree centigrade to give a homogeneous solution. To this homogeneous solution was added 33.6 g of 4-mercaptomethyl-1,8-dimercapto-3,6-dithiaoctane, and the resulting solution was mixed and dissolved at a temperature of from 0 to 10 degree centigrade. At the same temperature, the mixed solution was degassed under 400 Pa for 1 hour, and then filtered through a 1-μm PTFE filter to obtain a solution. The obtained solution was sufficiently fluid to flow. Then, the solution was injected into a mold equipped with a glass mold and tapes. This mold was put into an oven and gradually heated from 25 to 120 degree centigrade over 21 hours. As a result, the solution was polymerized without using an organic tin catalyst with no problem. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.3, heat resistance (Tg) of 87.2 degree centigrade, and color (YI) of 5.6. It was suitable as an optical transparent resin. Furthermore, weather resistance ($\Delta YI$) was 1.5. The evaluation results were shown in Table 1.

Comparative Example 1

Before a polymerization composition was produced, a block of di-n-butyltin dichloride (simply referred to as DBC in Table 1) to be used as a catalyst was pulverized in a required amount. Since DBC might possibly be harmful to the human body in the pulverizing operation, a careful operation was required. 36.4 g of m-xylylene diisocyanate was mixed with 0.0105 g of di-n-butyltin dichloride (simply referred to as DBC in Table 1) as a catalyst, 0.070 g of an internal mold release agent (STEPAN Company, product name: Zelec UN) and 0.035 g of an ultraviolet absorber (Kyodo Chemical Co., Ltd., product name: BioSorb 583) at 20 degree centigrade, and the mixture was dissolved to give a homogeneous solution. To this homogeneous solution was added 33.6 g of 4-mercaptomethyl-1,8-dimercapto-3,6-dithiaoctane, and the resulting solution was mixed and dissolved at 20 degree centigrade. The mixed solution was degassed under 400 Pa for 1 hour, and then filtered through a 1-μm PTFE filter. Then, the resulting solution was injected into a mold equipped with a glass mold and tapes. This mold was put into a polymerization oven and then gradually heated from 25 to 120 degree centigrade at which polymerization was conducted for 21 hours. After completion of polymerization, the mold was taken out from the oven and a resin was easily released from the mold. The obtained resin was additionally annealed at 130 degree centigrade for 4 hours. The obtained resin had transparency. Further, it had a refractive index (ne) of 1.665, Abbe number (ve) of 31.7, heat resistance (Tg) of 87.9 degree centigrade, and color (YI) of 5.2. It was suitable as an optical transparent resin. Furthermore, weather resistance (ΔYI) was 2.4. The evaluation results were shown in Table 1.

In Table 1, internal mold release agents (concentration thereof) and catalysts (concentration thereof) used in the polymerization compositions of Examples 4 to 6, 11 to 14, and Comparative Example 1 were illustrated. Furthermore, a refractive index (ne), Abbe number (ve), heat resistance (Tg), color (YI), transparency, releasability and weather resistance (ΔYI) of the obtained resin composition were also illustrated.

TABLE 1

| | Internal mold release agent (ppm) | Catalyst (ppm) | ne | ve | Tg (° C.) | YI | Transparency | Releasability | ΔYI |
|---|---|---|---|---|---|---|---|---|---|
| Example 4 | Internal mold release agent 1 (1010) | — | 1.665 | 31.3 | 87.8 | 5.4 | ◯ | ◯ | 1.2 |
| Example 5 | Internal mold release agent 2 (1010) | — | 1.665 | 31.4 | 87.8 | 5.4 | ◯ | ◯ | 1.1 |
| Example 6 | Internal mold release agent 3 (1080) | — | 1.665 | 31.4 | 88.9 | 5.3 | ◯ | ◯ | 1.0 |
| Example 11 | Internal mold release agent 4 (1000) | — | 1.665 | 31.4 | 86.8 | 6.0 | ◯ | ◯ | 1.5 |
| Example 12 | Internal mold release agent 5 (1000) | — | 1.665 | 31.2 | 86.7 | 5.9 | ◯ | ◯ | 1.3 |
| Example 13 | Internal mold release agent 6 (1000) | — | 1.665 | 31.0 | 87.2 | 5.7 | ◯ | ◯ | 1.7 |
| Example 14 | Internal mold release agent 7 (500) | — | 1.665 | 31.3 | 87.2 | 5.6 | ◯ | ◯ | 1.5 |
| Comparative Example 1 | Zelec (1000) | DBC (150) | 1.665 | 31.7 | 87.9 | 5.2 | ◯ | ◯ | 2.4 |

As clear from Table 1, by using internal mold release agents 1 to 7 obtained in Examples 1 to 3, and 7 to 10, without newly adding a catalyst, transparent resins suitable for optical use were obtained by releasing from the mold. There is no need to add a catalyst, the operation is simplified and an organic tin compound causing the risk of injury to the human body is not used. So, the safety of the operation is high. Furthermore, surprisingly, as compared to a resin obtained with a conventional organic tin catalyst, improvement of weather resistance is observed.

The invention claimed is:

1. A composition for polythiourethane optical materials comprising an isocyanate compound, an active hydrogen compound having a mercapto group, and an internal mold release agent,
    wherein the isocyanate compound is at least one selected from the group consisting of m-xylylene diisocyanate, 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane and hexamethylene diisocyanate;
    the active hydrogen compound is at least one selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane and 2-(2,2-bis(mercaptomethylthio)ethyl)-1,3-dithietane; and
    the internal mold release agent is obtained by the reaction of an acidic phosphate ester compound represented by the formula (1) with Zn:

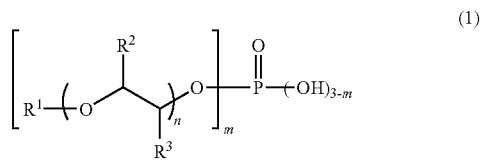

(1)

wherein, in the formula, m represents 1 or 2; n represents an integer of 0 to 20; $R^1$ represents an alkyl group having 1 to 20 carbon atoms, an alkylphenyl group having 7 to 20 carbon atoms or a phenylalkyl group having 7 to 20 carbon atoms;
    and $R^2$ and $R^3$ each independently represent a hydrogen atom, a methyl group or an ethyl group; and wherein the Zn is in an amount of 0.01 to 20 weight % based on the total amount of the internal mold release agent, and wherein the composition does not contain an organic tin compound.

2. A polythiourethane optical material obtained by curing the composition for polythiourethane optical materials according to claim 1.

3. A plastic lens comprising the polythiourethane optical material according to claim 2.

4. A process for producing polythiourethane optical materials, comprising curing the composition for polythiourethane optical materials according to claim 1.

5. The process for producing polythiourethane optical materials according to claim 4, in which the amount of said internal mold release agent is not less than 100 ppm but not more than 10,000 ppm based on the total amount of the isocyanate compounds and the active hydrogen compounds.

* * * * *